United States Patent [19]

Spence

[11] 3,822,757

[45] July 9, 1974

[54] INDIVIDUAL VEHICLE WHEEL DRIVE AND SUSPENSION ASSEMBLY

[76] Inventor: William George Spence, 2372 Wilson Ave., Montreal, Quebec, Canada

[22] Filed: June 26, 1972

[21] Appl. No.: 266,135

Related U.S. Application Data

[63] Continuation-in-part of Ser. No. 68,618, Sept. 1, 1970, Pat. No. 3,689,101.

[52] U.S. Cl. .............................. 180/43 A, 280/92
[51] Int. Cl. ........................................... B60b 39/00
[58] Field of Search ..... 180/43 A; 64/15 C, 27 NM; 74/411, 606; 280/92

[56] References Cited
UNITED STATES PATENTS

| | | | |
|---|---|---|---|
| 779,351 | 1/1905 | Douglas | 180/43 C |
| 1,331,748 | 2/1920 | Fisker | 64/15 C |
| 1,422,671 | 7/1922 | Cochran | 280/92 |
| 1,780,727 | 11/1930 | Tenney | 64/27 NM |
| 1,788,978 | 1/1931 | Buckendale | 74/606 |
| 1,840,407 | 1/1932 | Norman | 180/43 A |
| 2,894,594 | 7/1959 | Fenston | 74/411 |
| 3,001,409 | 9/1961 | Von Fumetti | 74/606 |

*Primary Examiner*—Leo Friaglia
*Assistant Examiner*—Jack D. Rubenstein

[57] ABSTRACT

A drive and suspension assembly for an individual roadwheel of a vehicle including a rearwardly and downwardly inclined lever arm pivotally connected to the vehicle frame at its upper end and rotatably supporting the roadwheel at its lower end, a main gear fast with the roadwheel and a drive pinion journalled on the lever arm and meshing with the main gear to drive the same. The pinion, during rotation to produce forward movement of the vehicle tends to walk around the main gear so as to produce an upward bias on the lever arm and consequently on the vehicle frame thereby forming a drive induced suspension for the vehicle and increasing the traction of the roadwheel. Abutment means limit the rotation of the lever arm with respect to the vehicle frame in both directions of rotation. The driving train includes a serially connected yieldable drive link to absorb the variations in the rotational speed of the driving pinion caused pivoting movement of the lever arm with respect to the vehicle frame. The pivotal mounting of the lever arm on the vehicle frame is angularly adjustable to allow the use of the drive assembly on either side of the vehicle. The assembly is adapted for steerable mounting of the roadwheel.

9 Claims, 10 Drawing Figures

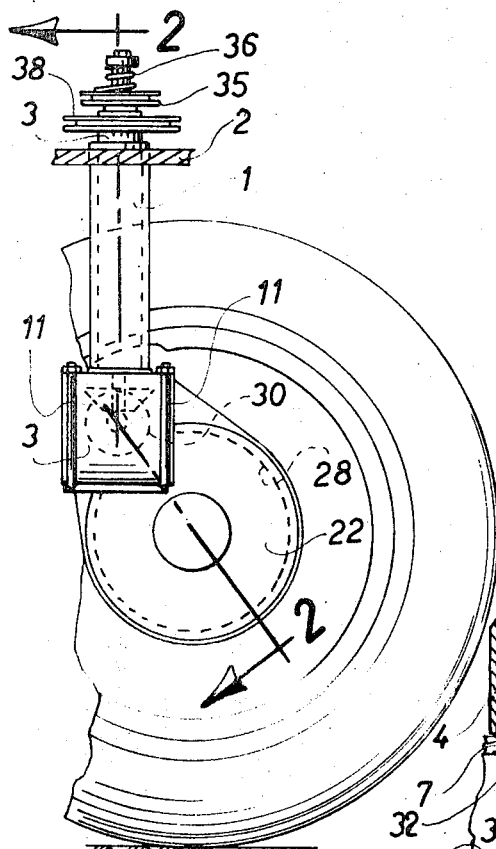
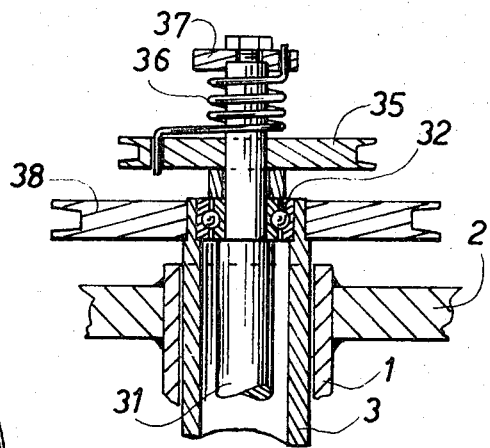
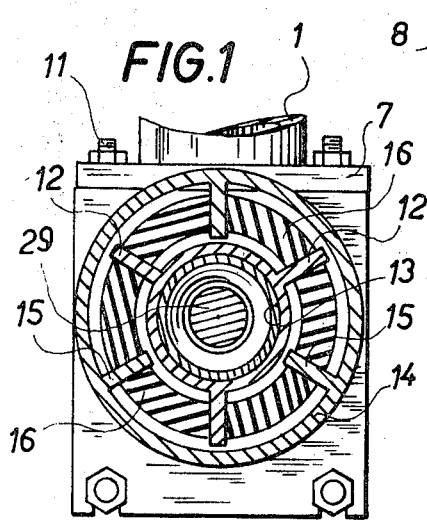
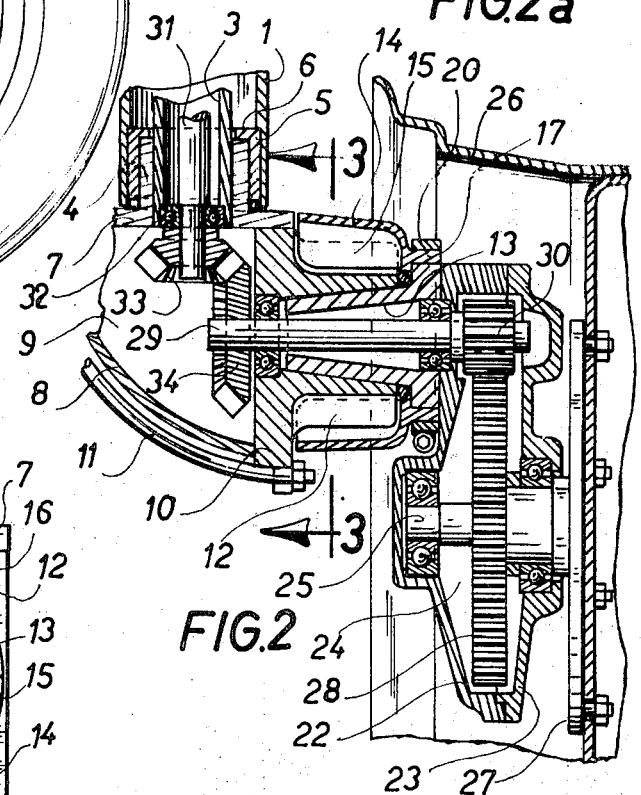
FIG.1
FIG.2a
FIG.2
FIG.3

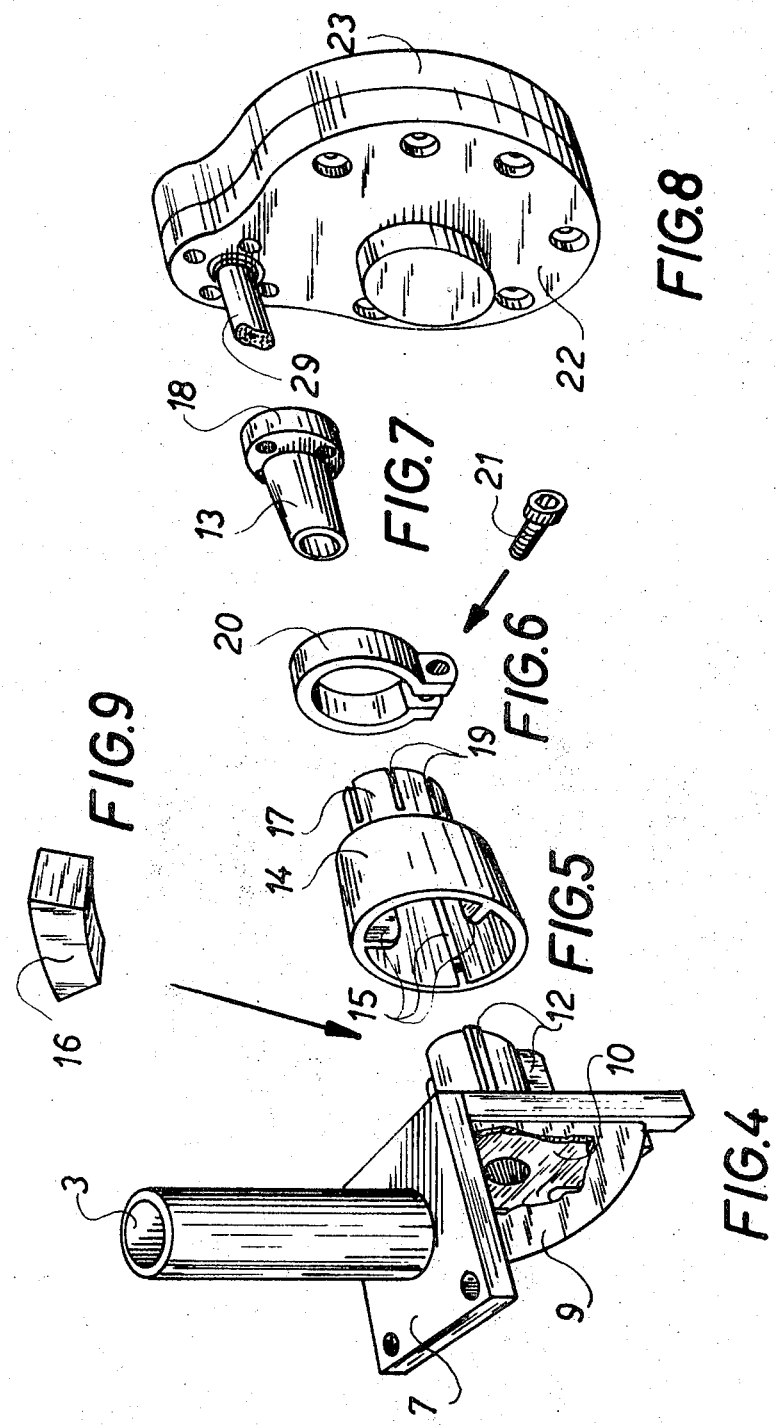

INDIVIDUAL VEHICLE WHEEL DRIVE AND SUSPENSION ASSEMBLY

This is a continuation-in-part of my copending application Ser. No. 68,618 filed Sept. 1, 1970 for "SWIVELLING WHEEL SUSPENSION FOR VEHICLES", now U.S. Pat. No. 3,689,101 of Sept. 5, 1972.

The present invention relates to a drive and suspension assembly for an individual wheel of a motor vehicle and, in particular, for a steerable wheel.

Applicant has noted that the traction of a roadwheel of a motor vehicle may be increased by rotatably mounted the roadwheel on the lower end of a lever arm which is pivoted at its upper end and by driving the roadwheel through gears such as to produce a downwardly biasing action on the lower end of the lever arm and the roadwheel upon forward rotation of the roadwheel. There results a couple on the lever arm which constitutes the suspension for the vehicle and increases the traction of the roadwheel. Consequently, the above-mentioned drive and suspension assembly may advantageously be put into use on vehicles of the off-highway and farm tractor types.

It is therefore a general object of the invention to provide a drive assembly for an individual roadwheel of a vehicle which is adapted to increase the traction of a driven roadwheel by driving the latter.

It is a more specific object of the invention to provide a drive assembly for an individual roadwheel of a vehicle which biases the roadwheel downwardly upon rotation of the latter to increase the traction thereof.

It is a still more specific object of the invention to rotatably mount a roadwheel on the lower end of a lever arm which has its upper end pivoted to the body of a vehicle and to yieldably drive the roadwheel, through a main gear fast with the roadwheel and through a drive pinion meshing with the main gear and journalled on the lever arm and tending to walk around the main gear during forward drive and thus lift the vehicle frame to provide the suspension therefor. Another object of the invention is to provide a yieldable drive link serially connected in the drive train of the vehicle to absorb variations in the rotational speed of the pinion produced by rotation of the lever arm about the vehicle frame. Another object of the invention is to provide means for resiliently limiting the rotation of the lever arm with respect to the vehicle frame. Another object of the invention is to adapt the assembly so that the roadwheel can be made steerable. Another object of the invention is to provide means for angularly adjusting the lever arm inclination allowing the use of the drive and suspension assembly on either side of the vehicle without modifying the assembly.

The above and other objects and advantages of the invention will be better understood in the light of the following detailed description of a preferred embodiment which is illustrated, by way of example only, in the accompanying drawings, in which:

FIG. 1 is a side elevation view of a wheel drive and suspension assembly according to the invention;

FIG. 2 is a cross-sectional view as seen along line 2—2 in FIG. 1;

FIG. 2a is a partial cross-sectional view as seen along line 2—2 in FIG. 1, showing the yieldable drive link forming part of the present invention;

FIG. 3 is a cross-sectional view as seen long line 3—3 in FIG. 2;

FIGS. 4 to 9 inclusive are perspective views of the major components respectively of a shock absorbing pivot connection, drawn in an exploded view arrangement.

The illustrated wheel drive and suspension assembly includes a mounting tube 1 which is welded or otherwise secured to a horizontal plate 2 or to any other convenient portion of the body of a vehicle. A steering tube section 3 is rotatably mounted into the mounting tube section 1 and has a sleeve 4 secured to the lower end thereof for rotation therewith. A sleeve bearing 5 centers the lower end of the tube section 3 within the mounting tube 1 and is axially retained in place by an internal flange 6 at the upper edge thereof.

The sleeve 4 is flanged at the lower end to form a square plate 7, as best shown in FIG. 4. The plate 7 forms the top wall of a gear housing also including a curved wall 8, a pair of opposite side walls 9 and a tubular pivot support 10, all rigidly held together by a pair of curved bolts 11 joining an outwardly projecting edge of the plate 7 to an outwardly projecting edge of the tubular pivot support member 10.

The tubular member 10 forms a tubular extension having external radial ribs or abutments 12 extending from the periphery thereof and circumferentially spaced apart from each other. A hollow conical pivot member 13 is rotatably mounted into a conical axial aperture through the tubular pivot support 10. A second tubular member 14 engages around the tubular extension of the member 10 and is formed with ribs or abutments 15 extending radially inwardly and arranged to engage one between each pair of successive abutments 12 and in circumferentially spaced-apart relationship relative to each other. A resilient shock absorbing block 16, for instance of rubber, is mounted between each pair of adjacent external abutment 12 and internal abutment 15, as best shown in FIG. 3. The tubular member 14 is formed with a reduced diameter portion 17 arranged to engage over the larger diameter portion 18 of the hollow conical pivot member 13, as shown in FIGS. 2, 5, and 7. The reduced diameter portion 17 is preferably provided with longitudinal slits 19 and a U clamp 20 provided with a screw 21 engages around the slitted reduced diameter portion 17 to clamp the same around the enlarged diameter portion 18 of the conical pivot member 13. There results a releasable and angularly adjustable clamping of the tubular member 14 to the conical pivot member 13 for bodily rotation of one with the other.

A hollow lever arm is formed by a pair of complementary plates 22 and 23 which are shaped and arranged to constitute a housing defining an internal gear chamber 24. The upper end of the plate 22 is secured to the enlarged diameter portion 18 to bodily pivot with the hollow conical pivot member 13 and the tubular member 14. A wheel axle 25 is rotatably mounted onto the lower and free end of the hollow lever arm by means of suitable bearings, as shown in FIG. 2. A wheel hub 26 is fixed to the flange 27 formed on the outer end of the wheel axle 25 and is adapted to mount a tire thereon to form a roadwheel.

A main spur gear 28 is secured in any convenient manner to the wheel axle 25 to rotate therewith. A cross shaft 29 is rotatably mounted into the hollow conical pivot member 13, coaxially with the latter, by suitable bearings, such as is illustrated in FIG. 2. A pinion gear 30 is secured to the cross shaft 29 for rotation therewith in meshing engagement with the main spur gear 28 within the hollow lever arm formed by the complementary plates 22 and 23. An upright shaft 31 is rotatably mounted into the steering tube section 3 by suitable bearings 32 and defines an upright pivot axis which intersects the pinion axis defined by the pinion gear 30 and the supporting cross shaft 29. A bevel gear 33 is secured to the lower end of the upright shaft 31 in meshing engagement into the gear housing defined by the members 7,8,9,10 with a bevel gear 34 secured to the cross shaft 29 to transmit rotation to the latter.

An input drive pulley 35 is rotatably mounted around the upper end of the upright shaft 31 and a torsion spring 36 has one end secured to the pulley 35 and the other end secured to a ring 37 which is mounted onto the end of the shaft 31 for rotation therewith. The torsion spring 36 therefore forms a yieldable and resilient drive link between the input drive pulley and the upright shaft 31. As will be better understood later in the light of the description of the operation of the illustrated drive assembly, the torsion spring 36 and the pulley 35 can be replaced by different other types of yieldable drive links serially connected in the drive train of the vehicle such as for instance a friction clutch or a different spring arrangement.

Another pulley 38 is keyed or otherwise secured to the upper end of the steerable tube section 3 to be operated by a steering cable, not shown, and to steer the roadwheel about the upright pivot axis from which the roadwheel is laterally offset.

As illustrated in FIG. 1, the hollow lever arm is operatively inclined downwardly and rearwardly relative to the pinion axis and relative to the forward direction of travel of the vehicle such that the pinion gear 30 engages the main gear 28 intermediate the highest and the frontmost circumferential portions or points thereof. Upon forward drive of the roadwheel, there is produced a partial compression of the torsion spring 36, and a tendency of the pinion gear 30 to walk on the main gear 28, in a direction to lift the vehicle frame thereby forming a suspension therefor. There results, a downward action on the roadwheel and the lower end of the lever arm with consequent increased traction of the roadwheel.

There is therefore produced a drive assembly which provides a dynamic suspension of each individual roadwheel of a vehicle. Each level arm is allowed to rotate about the vehicle frame within practical limits imposed by the extension and compression limits of the resilient shock absorbing blocks 16 or by a pair of fixed stops, which can be used for that purpose. When the vehicle engine is stopped, the lever arms take a lower limit position due to blocks 16 and the latter also prevent overturning of the lever arms about the wheel axles when a reaction torque is produced sufficient to overcome the load on the upper ends of the lever arms.

As will be appreciated, the yieldable drive link or torsion spring 36 prevents or cushions the transmission of rotational shocks to the drive unit, not shown, for the pulley 15. Such shocks are caused by the up-and-down displacement of the roadwheel relative to the vehicle body while traversing an uneven terrain line resulting in sudden variations in the rotational speed of the drive pinion.

It may also be noted that the angle of the hollow lever arm defined by the complementary plates 22 and 23 may be selectively adjusted to change the height of any roadwheel of a vehicle relative to the body thereof, as may be convenient for sidehill operation, and plowing or other farm operation when, for instance, the wheels on one side run below the wheels on the other side of the vehicle. Another advantage of the angular adjustment is that it allows to use the same drive assembly on either side of a vehicle by appropriately adjusting the angle of the lever arm on one side or the other relative to an upright plane passing through the pinion axis. By reducing power to the wheels on the inside of a turn, the vehicle can be made to bank against the centrifugal force exerted on the vehicle during the turn.

The above-mentioned and other changes in the details of the illustrated embodiment are considered within the principle and scope of the invention as defined by the appended claims.

I claim:

1. In an individual wheel drive and suspension assembly for a motor vehicle having a vehicle frame, the combination comprising a wheel axle, a main gear connected to said wheel axle for rotation therewith, a pinion gear meshing with said main gear, a lever arm rotatably supporting said main gear and said pinion gear, pivotally mounted on said vehicle frame about an axis extending substantially parallel to and spaced from said wheel axle and adapted to be inclined downwardly and rearwardly about said axis relative to said vehicle frame and relative to the forward direction of travel of the vehicle, and drive means connected to said pinion gear to rotate the same and drive said main gear and wheel axle whereby the pinion during its rotation in a direction to produce forward travel of the vehicle tends to walk around said main gear and lift said vehicle frame thereby providing a drive induced suspension of the vehicle, and means to limit the extent of lever arm pivotal movement about said vehicle frame.

2. In an individual wheel drive and suspension assembly as claimed in claim 1, wherein said motor vehicle includes a drive train for said pinion gear and further including a yieldable drive link serially connected to said drive train to absorb the variations of pinion gear rotational speeds caused by pivoting of the lever arm about said vehicle frame.

3. In an individual wheel drive and suspension assembly as claimed in claim 1, wherein the rotational axis of said pinion gear is coaxial with the pivotal axis of said lever arm on said vehicle frame.

4. In an individual wheel drive and suspension assembly as claimed in claim 1, wherein said limiting means include interdigitated elastic abutments fast with said lever arm and with said vehicle frame to elastically limit pivoting of said lever arm with respect to said vehicle frame in both directions of rotation.

5. In an individual wheel drive and suspension assembly as claimed in claim 3, wherein said vehicle frame has a pivot mounting means fixed thereto and defining an upright pivot axis, said wheel drive and suspension assembly further including an upright pivot member journalled in said upright pivot mounting means for rotation about said upright pivot axis, said lever arm being pivotally connected to said pivot member with said lever arm axis extending transversely of said upright pivot axis and intersecting the same to produce steering of said roadwheel upon rotation of said pivot member.

6. In an individual wheel drive and suspension assembly as claimed in claim 5, wherein said pivot member constitutes an upright tube section, a gear housing is secured to and communicates with the lower end of said upright tube section, said lever arm is a casing pivoted to said gear housing in an operative plane laterally offset from said upright pivot axis, communicating with the interior of said gear housing and forming a receptacle for said pinion gear and said main gear, and said drive train includes portions extending through said tube section said gear housing and said casing and connected to said pinion gear to rotate the latter.

7. An individual wheel drive and suspension assembly as claimed in claim 6, wherein said drive train includes an upright drive shaft rotatably mounted within said upright tube section, a pulley rotatably mounted on said upright drive shaft at the upper end thereof and serving as an input drive means and said yieldable drive link consisting of a torsion spring joined at opposite ends to said pulley and to said upright drive shaft respectively.

8. An individual wheel drive and suspension assembly as claimed in claim 6, wherein said drive train includes an upright drive shaft rotatably mounted in said tube section, a first bevelled gear is fixed to the lower end of said upright drive shaft, a cross shaft extending within said housing and casing, and intersecting the axis of said upright drive shaft, a second bevel gear secured to one end of said cross shaft in meshing engagement with said first bevel gear, and said pinion gear being fixed to the other end of said cross shaft.

9. An individual wheel drive and suspension assembly as claimed in claim 8, wherein said gear housing forms a first tubular member at the lower end of said upright tube section, which surrounds said cross shaft and is coaxial therewith, said casing forms a second tubular member which surrounds said cross shaft, is coaxial therewith, and is rotatably inserted within said first tubular member for rotation of said casing about said upright tube section, said limiting means including external rigid abutments circumferentially spaced from each other around said first tubular member and rigidly secured thereto and radially outwardly extending therefrom, a third tubular member surrounding said external abutments, internal abutments rigidly secured to said third tubular member and extending radially inwardly therefrom in interdigitated relation with said first abutment members, resiliently compressible blocks disposed between each pair of one external and one internal abutment, said third tubular member being rotatably mounted on said first tubular member and further including clamp means to angularly adjustably secure said third tubular member on said first tubular member to selectively vary the angle of the lever arm relative to the vehicle and to allow the use of the drive assembly on either side of the latter.

* * * * *